(12) United States Patent
Gangopadhyay et al.

(10) Patent No.: US 10,073,200 B2
(45) Date of Patent: Sep. 11, 2018

(54) NANO-GAP GRATING DEVICES WITH ENHANCED OPTICAL PROPERTIES AND METHODS OF FABRICATION

(71) Applicant: The Curators of the University of Missouri, Columbia, MO (US)

(72) Inventors: Shubhra Gangopadhyay, Columbia, MO (US); Venu Korampally, Aurora, IL (US); Sagnik Basuray, Columbia, MO (US); Kunal Bhatnagar, College Station, TX (US); Avinash Pathak, Columbia, MO (US); Arnab Ghosh, Columbia, MO (US); Drew Edwin Menke, Berger, MO (US); Joseph Mathai, Columbia, MO (US); Peter Cornish, Columbia, MO (US); Keshab Gangopadhyay, Columbia, MO (US); Aaron Wood, Columbia, MO (US)

(73) Assignee: The Curators of the University of Missouri, Columbia, MO (US)

( * ) Notice: Subject to any disclaimer, the term of this patent is extended or adjusted under 35 U.S.C. 154(b) by 557 days.

(21) Appl. No.: 14/081,353

(22) Filed: Nov. 15, 2013

(65) Prior Publication Data

US 2014/0226207 A1   Aug. 14, 2014

Related U.S. Application Data

(60) Provisional application No. 61/850,232, filed on Feb. 11, 2013.

(51) Int. Cl.
*G02B 5/18* (2006.01)

(52) U.S. Cl.
CPC ............. *G02B 5/1842* (2013.01); *G02B 5/18* (2013.01); *G02B 5/1814* (2013.01); *G02B 5/1852* (2013.01); *G02B 5/1861* (2013.01)

(58) Field of Classification Search
CPC ...... G02B 5/1814; G02B 5/1861; G02B 5/18; G02B 27/0037; G02B 27/4272; G02B 27/0944; G02B 26/0808
See application file for complete search history.

(56) References Cited

U.S. PATENT DOCUMENTS 6,692,830 B2 *  2/2004  Argoitia ................... B41M 3/14
                                                        359/575
8,619,363 B1 * 12/2013  Coleman ................... G02B 5/18
                                                        359/576

(Continued)

OTHER PUBLICATIONS

Bhatnagar, Kunal et al. "Novel Plasmonics for Fluorescence Based Bio-detection." Date Published: Nov. 8, 2011. University of Missouri, Columbia.

*Primary Examiner* — Thomas K Pham
*Assistant Examiner* — Mitchell Oestreich
(74) *Attorney, Agent, or Firm* — Erise IP, P.A.

(57) ABSTRACT

A method of producing a grating structure comprises the steps of forming a stamp from flexible plastic material, the stamp including a negative of a periodic grating pattern on a first surface; forming an ink by applying a polymer film to the stamp, the ink including a first surface and an opposing second surface, wherein the first surface of the ink contacts the first surface of the stamp such that the ink retains a positive of the periodic grating pattern; placing the ink and the stamp on a substrate such that the second surface of the ink contacts an upper surface of the substrate; and removing the stamp from the ink by applying a tensional force to one edge of the stamp.

20 Claims, 12 Drawing Sheets

(56) References Cited

U.S. PATENT DOCUMENTS

2006/0192115 A1\* 8/2006 Thomas ............ G01N 21/6458
250/306
2009/0147361 A1\* 6/2009 Gardiner ............. G02B 5/1852
359/566

\* cited by examiner

NANO-GAP GRATING DEVICES WITH ENHANCED OPTICAL PROPERTIES AND METHODS OF FABRICATION

RELATED APPLICATION

The present application is a non-provisional application, and claims priority benefit with regard to all common subject matter, of U.S. Provisional Application No. 61/850,232, filed Feb. 11, 2013, and entitled "NANO-GAP GRATING DEVICES WITH ENHANCED OPTICAL PROPERTY AND FABRICATIONS THEREOF." The identified earlier-filed provisional application is hereby incorporated by reference in its entirety.

FEDERALLY SPONSORED RESEARCH OR DEVELOPMENT

This invention was made with Government support under Grant No. ECCS-1102070 awarded by the National Science Foundation and Grant No. W15QKN-11-9-0001-RPP1-H awarded by the Nano Technology Enterprise Consortium (NTEC). The Government has certain rights in the invention.

BACKGROUND

1. Field

Embodiments of the invention relate to structures for improving optical imaging and methods of their fabrication.

2. Related Art

Microscopic imaging is utilized for studying small objects in fields such as medical development, biological research, cancer research, metallurgy, and others. Imaging of microscopic objects often encounters the diffraction limit when trying to image increasingly small objects. Fluorescence spectroscopy can be utilized in ultrasensitive chemical and biological threat sensors. But fluorescence spectroscopy suffers from low image contrast and a limit on the detection capabilities. Uniform, periodic grating structures have been developed to offer improvement in microscopic imaging and fluorescence spectroscopy. However, the improvements may be limited and the production of the grating structures may require the usage of costly fabrication equipment and complex manufacturing techniques, leading to a high cost of the grating structures.

SUMMARY

Embodiments of the invention solve the above-mentioned problems and provide a distinct advance in the art of microscopic imaging and fluorescence spectroscopy. More particularly, embodiments of the invention provide grating structures with enhanced optical properties and methods of their fabrication.

A first embodiment of the invention provides a grating structure comprising a substrate, a base layer, and a first functional layer. The base layer is positioned on the substrate and includes a first surface with a plurality of grating elements positioned adjacent one another and an opposing second surface in contact with a surface of the substrate. The grating elements include a longitudinal peak and a longitudinal valley. The functional layer is positioned on the second surface of the base layer and provides electromagnetic field enhancement in the vicinity of the grating structure.

A second embodiment of the invention provides a method of producing a grating structure. The method comprises the steps of forming a stamp from flexible plastic material, the stamp including a negative of a periodic grating pattern on a first surface; forming an ink by applying a polymer film to the stamp, the ink including a first surface and an opposing second surface, wherein the first surface of the ink contacts the first surface of the stamp such that the ink retains a positive of the periodic grating pattern; placing the ink and the stamp on a substrate such that the second surface of the ink contacts an upper surface of the substrate; and removing the stamp from the ink by applying a tensional force to one edge of the stamp.

A third embodiment of the invention provides a method of producing a. The method comprises the steps of forming a stamp by applying a flexible plastic material to a mold which includes a periodic grating pattern, wherein the stamp retains a negative of the grating pattern on a first surface; forming an ink by applying a polymer film to the stamp, the ink including a first surface and an opposing second surface, wherein the first surface of the ink contacts the first surface of the stamp such that the ink retains a positive of the periodic grating pattern; placing the ink and the stamp on a substrate such that the second surface of the ink contacts an upper surface of the substrate; removing the stamp from the ink by applying a tensional force to one edge of the stamp; and applying a functional layer to the first surface of the ink.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Figure 1:
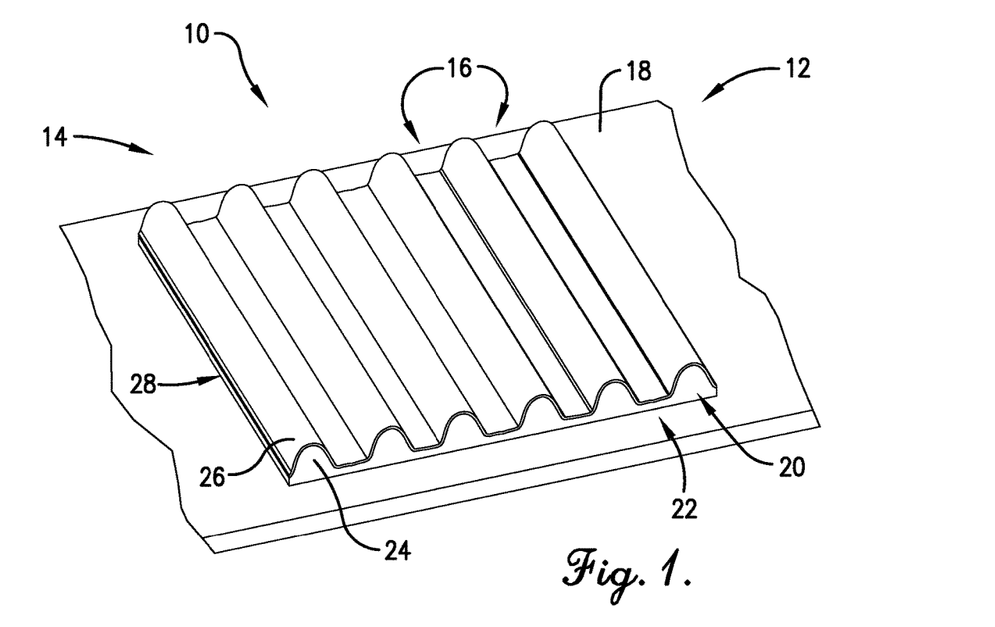
FIG. 1 is a perspective view of a grating structure including a first functional layer, a base layer, and a substrate, constructed in accordance with various embodiments of the invention.
Figure 3:
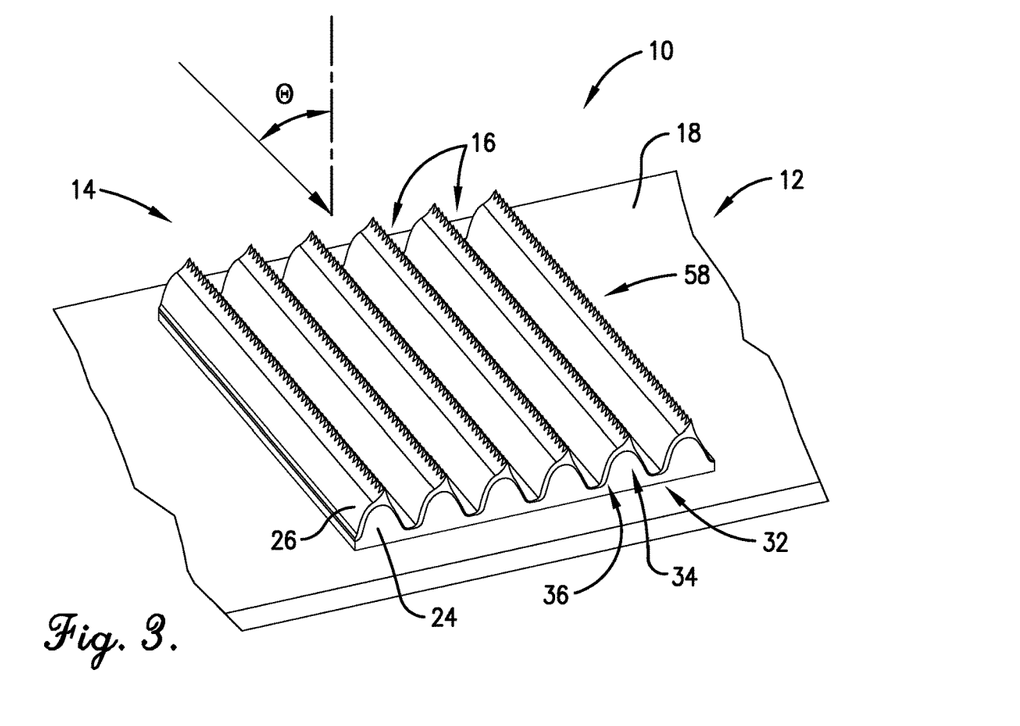
FIG. 3 is a perspective view of the grating structure with the first functional layer being deposited at an angle away from normal to the plane of the grating structure.
Figure 4:
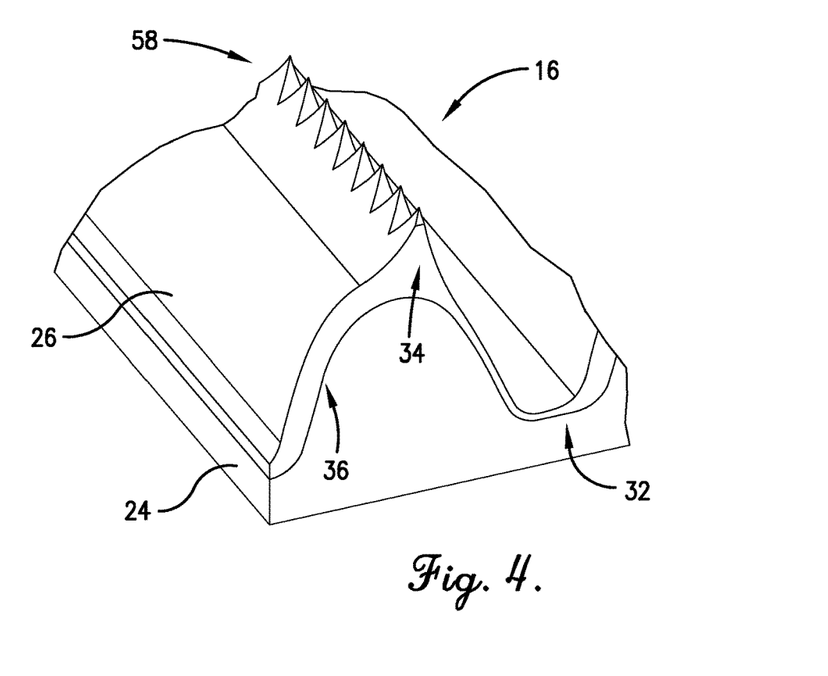
FIG. 4 is an enlarged view of a portion of the grating structure of FIG. 3.

A grating structure 10 with nanogap features, constructed in accordance with various embodiments of the invention, is shown in FIGS. 1, 3, and 4 and may broadly comprise a substrate 12 and an array 14 of grating elements 16. Various embodiments of the invention can provide optical wave guiding and imaging beyond the diffraction limit. The invention may be utilized in a sensing or imaging system which may improve the detection limits of harmful biological and chemical agents in food down to pico or femtomolar concentration levels. Similarly the invention may be used in anti-terrorism to detect any trace quantities of bio or chemically hazardous material. Embodiments of the invention may also be utilized in studying single molecule fluorescence phenomena in real time, enhancing surface-enhanced Raman spectroscopy (SERS), and the like.

Figure 2:
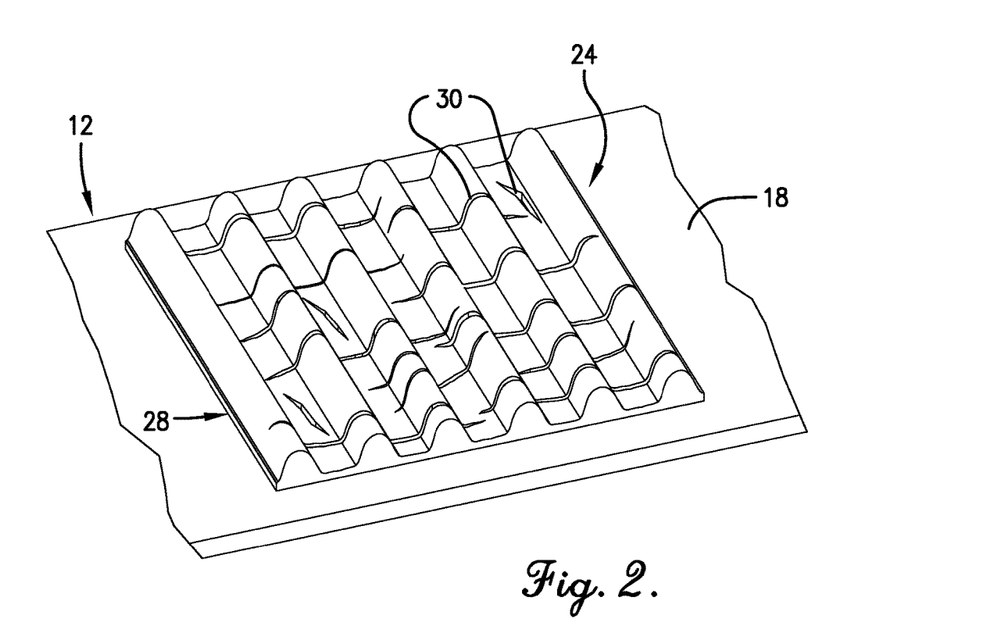
FIG. 2 is a perspective view of the base layer and the substrate from the grating structure of FIG. 1, the base layer including a plurality of nanogaps.

The substrate 12, as shown in FIGS. 1-3, generally provides a structural base or foundational support for the grating elements 16 and may be formed from silicon, glass, or combinations thereof. The substrate 12 may include an upper surface 18 that receives the grating elements 16. The upper surface 18 may be planar and smooth so as to easily bond with the grating elements 16.

The array 14, as shown in FIGS. 1 and 3, is arranged on the substrate 12 so that the grating elements 16 are parallel and positioned abutting one another. Each grating element 16 is generally elongated, relatively narrow, and is formed with a longitudinal peak 20 positioned next to a longitudinal valley 22. In some embodiments, the longitudinal axis of the grating elements 16 may be straight, while in other embodiments, the longitudinal axis may be curved. In some embodiments, the peak 20 may have a constant and continuous height along the length of the grating element 16, while in other embodiments, the peak 20 may have a variable height along the length of the grating element 16.

An exemplary grating element 16, as seen in FIG. 1, may have a cross-sectional profile that is a roughly half sine wave with the peak 20 having a generally rounded shape and the valley 22 being generally flat. An exemplary grating element 16 may have a width or pitch of approximately 400 nanometers (nm). The width of each grating element 16 may vary depending on the application for which the grating structure 10 is used. An exemplary peak 20 may have a height relative to the valley 22 of approximately 60 nm. In other embodiments, the grating element 16 may have a cross-sectional profile that is a roughly sine wave shape, a roughly triangle wave shape, a roughly square wave shape, a roughly sawtooth shape, variations thereof, or combinations thereof.

Each grating element 16 may include a base layer 24 and a first functional layer 26. The base layer 24, as seen without the first functional layer 26 in FIG. 2, may be positioned on the substrate 12 and may include a lower surface 28 which contacts and adheres to the upper surface 18 of the substrate 12. The base layer 24 may be formed from a polymer material or a polymer film such as polymethylsilsesquioxane (PMSSQ) and may have the same cross-sectional profile as the grating element 16 including the peak 20 and the valley 22. The base layer 24 may also be considered an ink.

The base layer 24 may further include a plurality of nanogaps 30, best seen in FIG. 2, wherein each nanogap 30 is an elongated, generally narrow gap or opening in the material of the base layer 24. Exemplary nanogaps 30 may have a width ranging from approximately 20 nm to approximately 30 nm, while the length of the nanogaps 30 may vary more greatly. In some embodiments, the nanogaps 30 may be randomly oriented and randomly distributed primarily in proximity to the edges of the array 14. In other embodiments, the nanogaps 30 may be more uniformly distributed across the array 14. In addition, the nanogaps 30 may generally be oriented or aligned with one another. In still other embodiments, there may be a combination of randomly oriented and distributed nanogaps 30 and more uniformly oriented and distributed nanogaps 30.

The first functional layer 26, as seen in FIGS. 1, 3, and 4, generally provides electromagnetic field enhancement in the vicinity of the grating structure 10. The first functional layer 26 may be applied or formed such that it does not fill in or completely cover the nanogaps 30 of the base layer 24. The first functional layer 26 may include either a plasmonic component or a photonic component. In embodiments of the first functional layer 26 with plasmonics, the first functional layer 26 primarily includes one or more layers of metal. An optional lower metal layer may provide improved adhesion between the base layer 24 and an upper layer of metal. An exemplary lower metal layer may include a thin layer of titanium, approximately 2 nm thick. A main upper layer of metal may provide plasmonic functionality. An exemplary metal for the upper metal layer is silver, approximately 100 nm thick, deposited on the first lower layer of metal. Silver is often utilized as the plasmonic material because it may allow or promote fluorescence in various applications of the grating structure 10 to a greater extent than other metals. In addition, silver may have a lower energy loss than other metals. Other metals can be used for either the first lower adhesion layer or the second, upper metal layer including silver, titanium, gold, chromium, alloys, or combinations thereof. In some embodiments, the plasmonic first functional layer 26 may further include a thin layer of dielectric or insulating material, such as silicon dioxide, rhodamine-doped PMSSQ, or similar materials positioned on the metal. The layer of dielectric may have a thickness ranging from approximately 10 nm to approximately 30 nm.

In embodiments of the first functional layer 26 with photonics (also referred to as photonic crystals), the first functional layer 26 primarily includes one or more layers of dielectrics. An exemplary photonic first functional layer may include titanium oxide ($TiO_2$), with a thickness ranging from approximately 100 nm to approximately 200 nm, deposited on the base layer 24. When the grating structure 10 is used for photonic applications, the thickness of the base layer 24 may be varied as well to provide different performance characteristics.

The first functional layer 26 may further include nanogaps 32 as well, seen in FIGS. 3 and 4, depending on the angle of deposition of the plasmonic or photonic material onto the base layer 24. If the plasmonic or photonic material of the first functional layer 26 is deposited onto the base layer 24 at an angle that is roughly normal to the plane of the substrate 12 and the base layer 24, as shown in FIG. 1, then no nanogaps 32 in the first functional layer 26 are formed. If the plasmonic or photonic material is deposited at an angle, such as θ shown in FIG. 3, away from the normal, then nanogaps 32 may be formed in parallel with the grating elements 16. The deposition angle may range from approximately zero degrees to approximately 85 degrees from planar normal, with a range from approximately 65 degrees to approximately 80 degrees providing optimal results. Typically, the plasmonic or photonic material is also deposited in a direction that is transverse to the longitudinal axis of the grating elements 16.

When the first functional layer 26 is deposited at an angle other than planar normal, each grating element 16 may include three regions, as seen in FIGS. 3 and 4, instead of just the two discussed above. The regions may include the nanogap 32, a tip 34, and a plateau 36. Furthermore, the tip 34 may include a plurality of nanospurs 58. When viewed in cross-sectional profile, the nanogap 32 may present a low point for the grating element 16, while the tip 34 may present a high point, with an angled, generally smooth surface therebetween. The plateau 36 may have a rounded shape that falls from the tip of one grating element 16 to the nanogap 32 of the adjacent grating element 16. In an exemplary embodiment in which the first functional layer 26 was deposited at an angle of approximately 76 degrees away from planar normal, the nanogap 32 has a width ranging from approximately 10 nm to approximately 30 nm, the tip 34 has a width ranging from approximately 10 nm to approximately 30 nm, and the plateau 36 has a width of approximately 90 nm. The nanospurs 58 may include or may form a plurality of peaks abutting one another along the length of the tip 34, as shown in FIGS. 3-6. Each nanospur 58 may have a shape of roughly a triangle, roughly a sawtooth, roughly a half sine wave, variations thereof, or combinations thereof. At the edges of each nanospur 58, or where the nanospurs 58 join with one another, there may be a sharp point.

The nanogap 32 and the tip 34 may behave like electromagnetic field concentrators, wherein the nanogap 32 acts as a lightning rod and the tip 34 acts as a nano antenna. The plateau 36 experiences interference from the two distinct electromagnetic fields resulting in either constructive or destructive interference. The large electromagnetic fields produced in the nanogap 30, the tip 34, and the plateau 36 are a result of the localized electromagnetic field enhancement. When the grating structure 10 is utilized in fluorescence imaging, either the lightning rod, the nano antenna, or the constructive interference effect may cause any fluorophore placed in the right region to fluoresce with a several fold higher intensity in comparison to the other regions. In addition, the nanospurs 58 positioned along the tips 34 may enhance or amplify the electromagnetic field to create regions along the grating structure 10 with an increased electromagnetic field known as hotspots.

Figure 5:
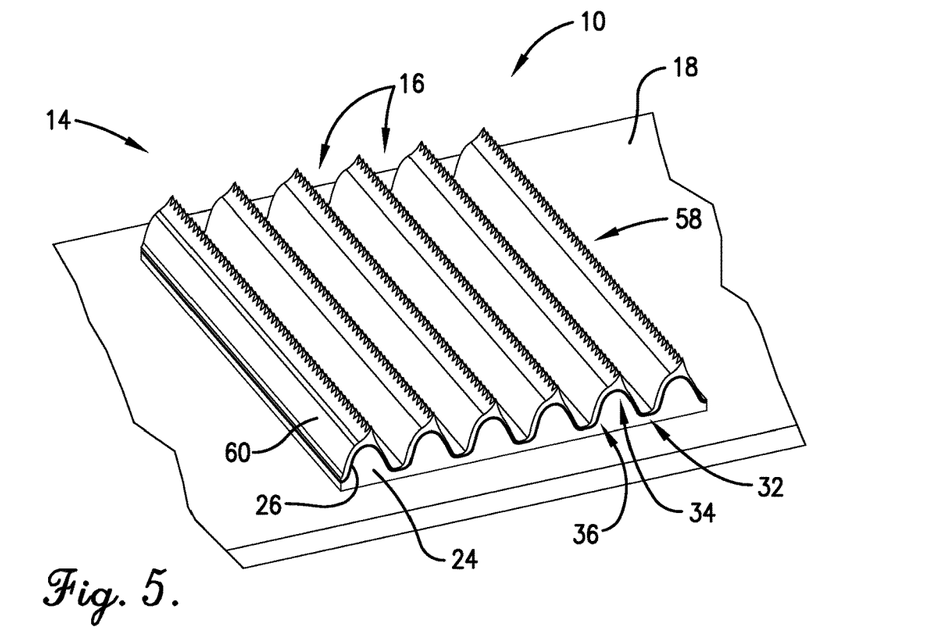
FIG. 5 is a perspective view of the grating structure with the first functional layer being deposited normal to the plane of the grating structure and a second functional layer being deposited at an angle away from normal to the plane of the grating structure.
Figure 6:
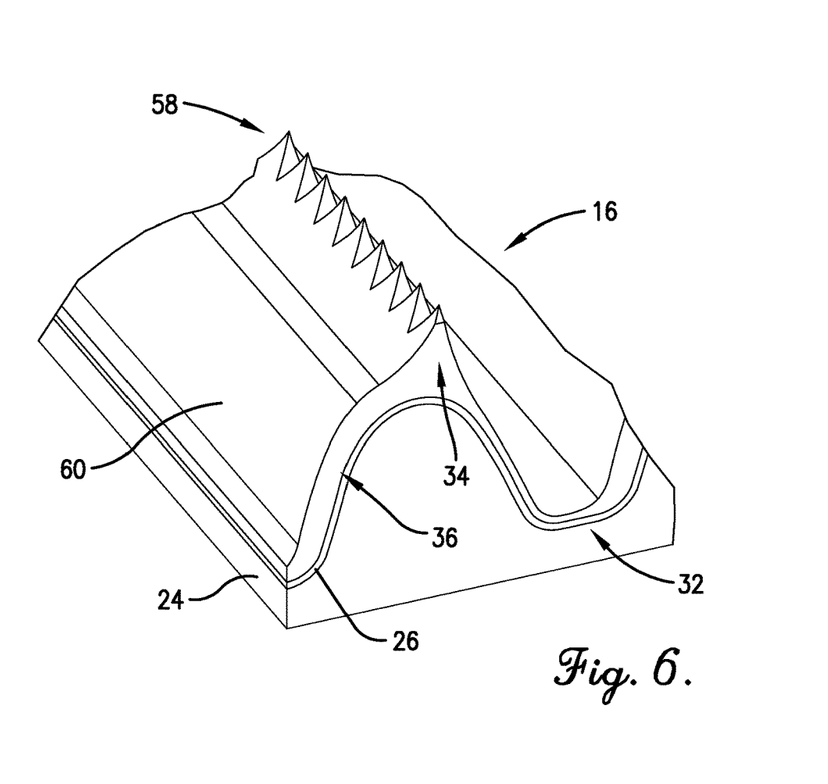
FIG. 6 is an enlarged view of a portion of the grating structure of FIG. 5.

In various embodiments, the grating structure 10 may further include a second functional layer 60, as seen in FIGS. 5 and 6, positioned on the upper surface of the first functional layer 26. Generally, with such embodiments, the first functional layer 26 is a photonic material functional layer 26 wherein the photonic material is a dielectric such as titanium oxide. The first functional layer 26 is deposited at angle of approximately zero degrees from planar normal, so that the first functional layer 26 may have a shape as seen in FIG. 1. The second functional layer 60 typically includes plasmonic material such as silver that is deposited at an angle ranging from greater than zero degrees to approximately 85 degrees from planar normal. Alternatively, both the first functional layer 26 and the second functional layer 60 may include plasmonic materials.

Figure 7:
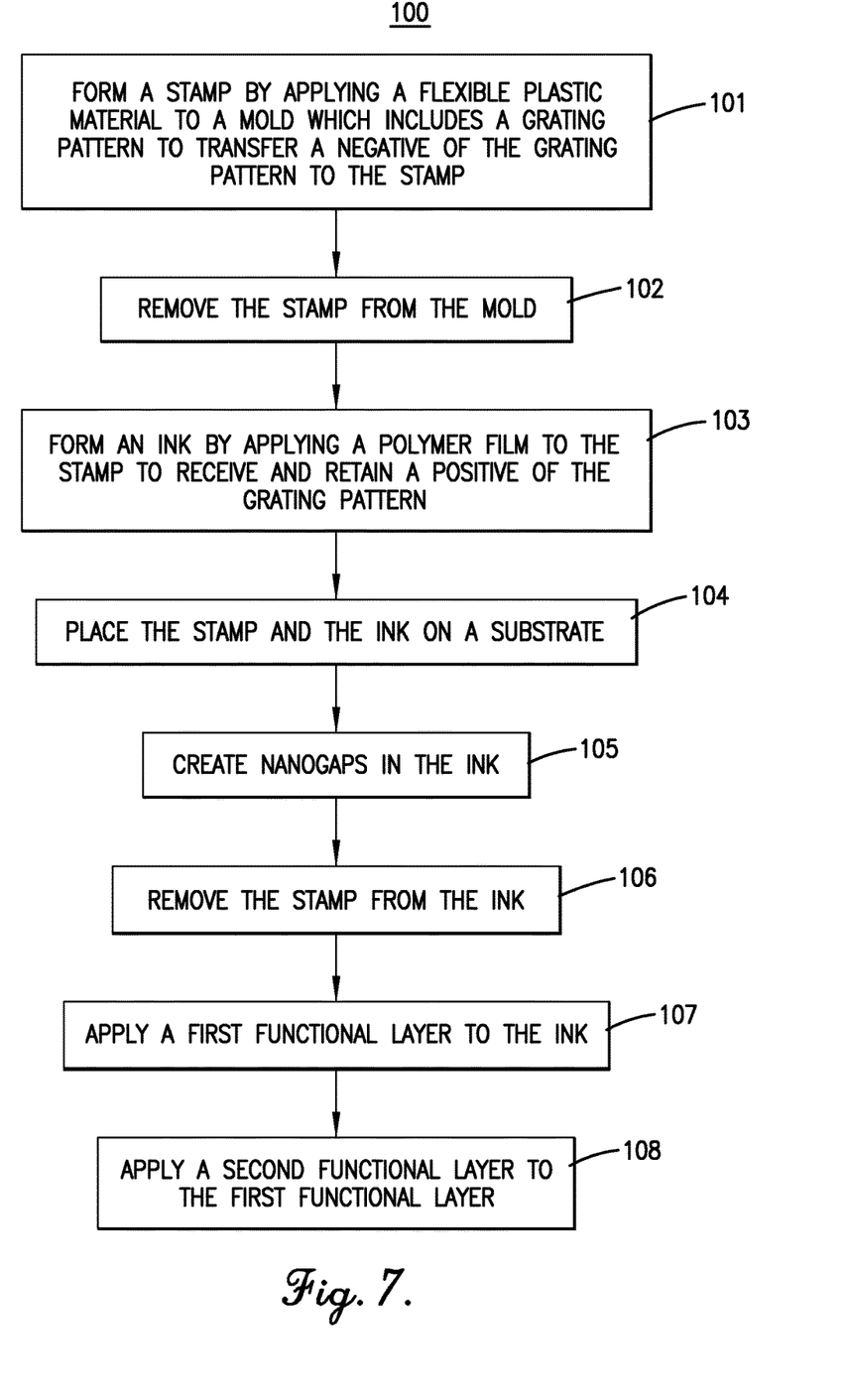
FIG. 7 is a flow diagram of at least a portion of the steps of a method of producing a grating structure.

At least a portion of the steps of a method 100, in accordance with various aspects of the invention, for producing a grating structure 10 is shown in FIG. 7. The steps of the method 100 may be performed in the order as shown in FIG. 7, or they may be performed in a different order. Furthermore, some steps may be performed concurrently as opposed to sequentially. In addition, some steps may not be performed.

Figure 8:
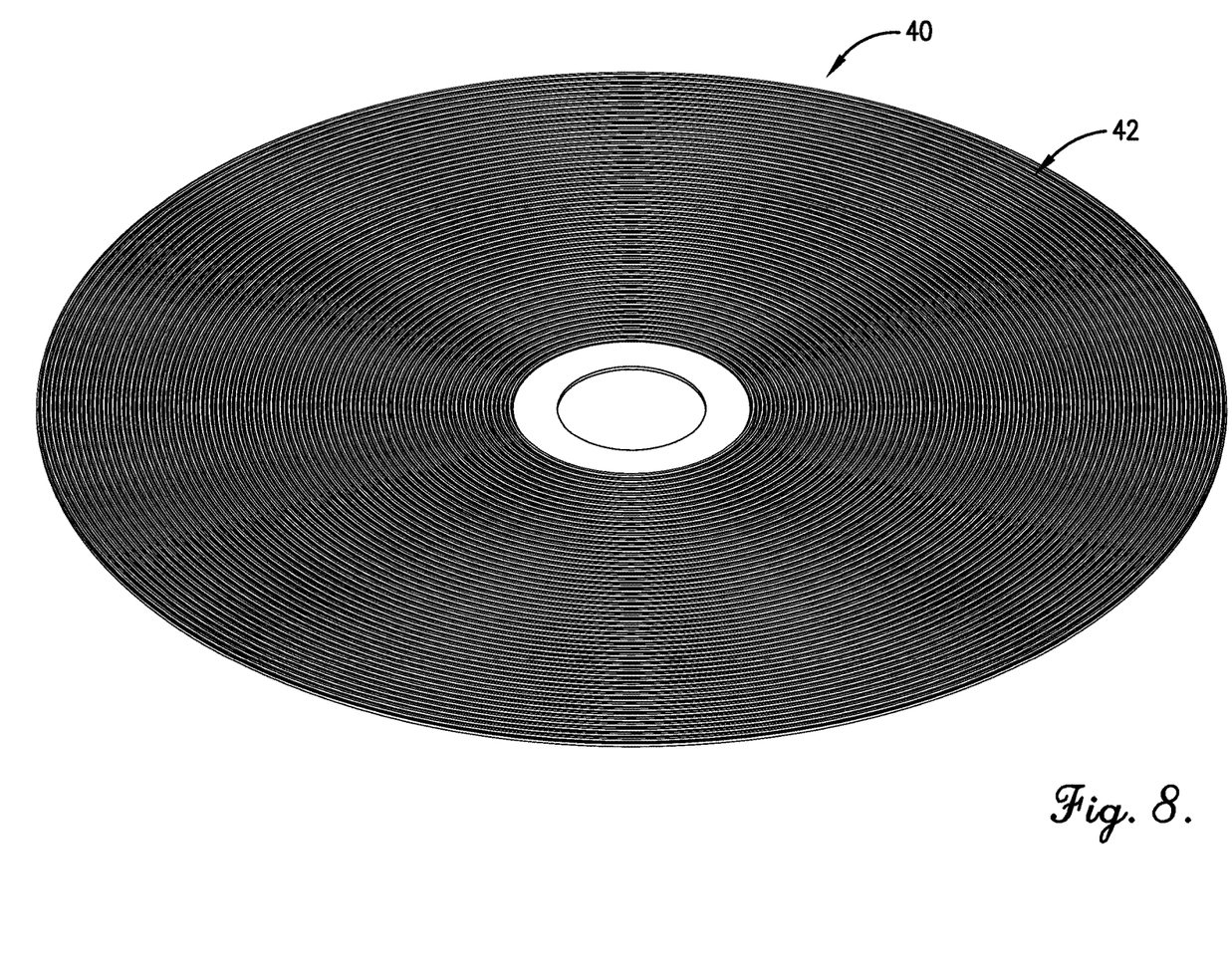
FIG. 8 is a perspective view of a mold created from a modified optical disc.

Referring to step 101, a stamp 38 is formed by applying a flexible plastic material to a mold 40, shown in FIG. 8, which includes a grating pattern 42 such that the plastic material receives and retains a negative of the grating pattern 42. The plastic material may include any flexible, somewhat resilient polymer that can adapt to the shape of a mold and retain that shape. An exemplary plastic material is polydimethylsiloxane (PDMS).

The mold 40 may be any solid object that includes the grating pattern 42 on one of its surfaces and may be constructed from materials such as metals, glass, silicon, or the like. The mold 40 may be produced by an exemplary process described below or by forming the grating pattern 42 in the mold 40 material using patterning and etching, e-beam lithography, reactive ion etching, machining, or the like. An exemplary mold 40 is an optical disc, such as a compact disc (CD), a digital video disc (DVD), a high definition DVD (HD-DVD), a Blu-ray™ disc, etc., which includes an internal data layer defined by a grating pattern, the same as or similar to the grating pattern 42, with a portion of the disc removed to expose the data layer and the grating pattern, as seen in FIG. 8.

The grating pattern 42 may be similar to the array 14, discussed above, wherein the grating pattern 42 includes a plurality of grating elements 16 with the characteristics mentioned above. The grating elements 16 of an exemplary grating pattern 42 may include a longitudinal peak 20 positioned next to a longitudinal valley 22 that in combination have a cross-sectional width of approximately 400 nm.

Figure 9:
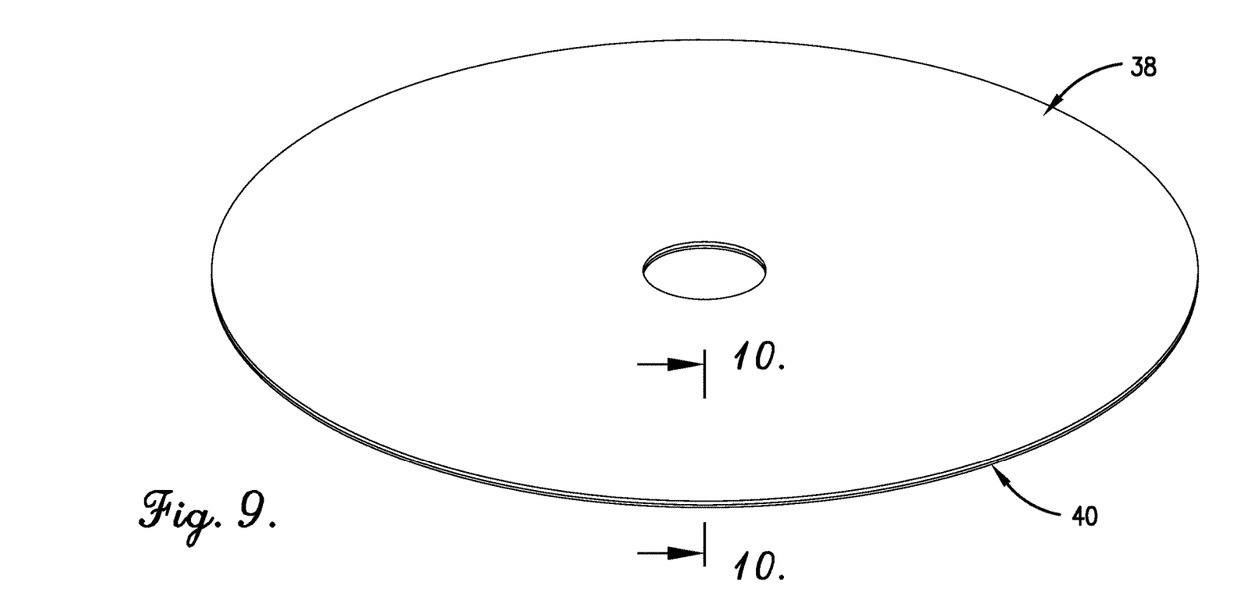
FIG. 9 is a perspective view of the mold coated with a plastic material to form a stamp.
Figure 10:
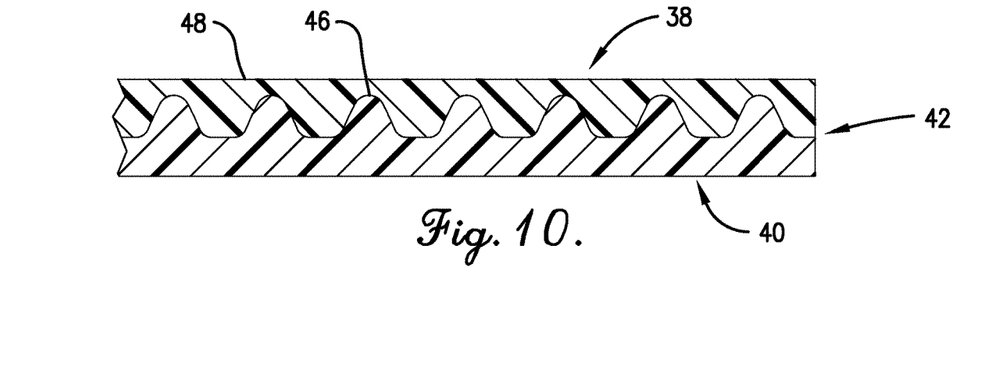
FIG. 10 is a sectional view of the mold and the stamp from FIG. 9 cut along the line 10-10.

The plastic material that forms the stamp 38 may initially be in a liquid form and may be applied to the surface of the mold 40 that includes the grating pattern 42 by spin coating the plastic material onto the mold 40 in a known fashion, the result of which is shown in FIGS. 9 and 10. The plastic material may cure on the mold 40 until it hardens and is solid to the touch—thereby forming the stamp 38.

Figure 11:
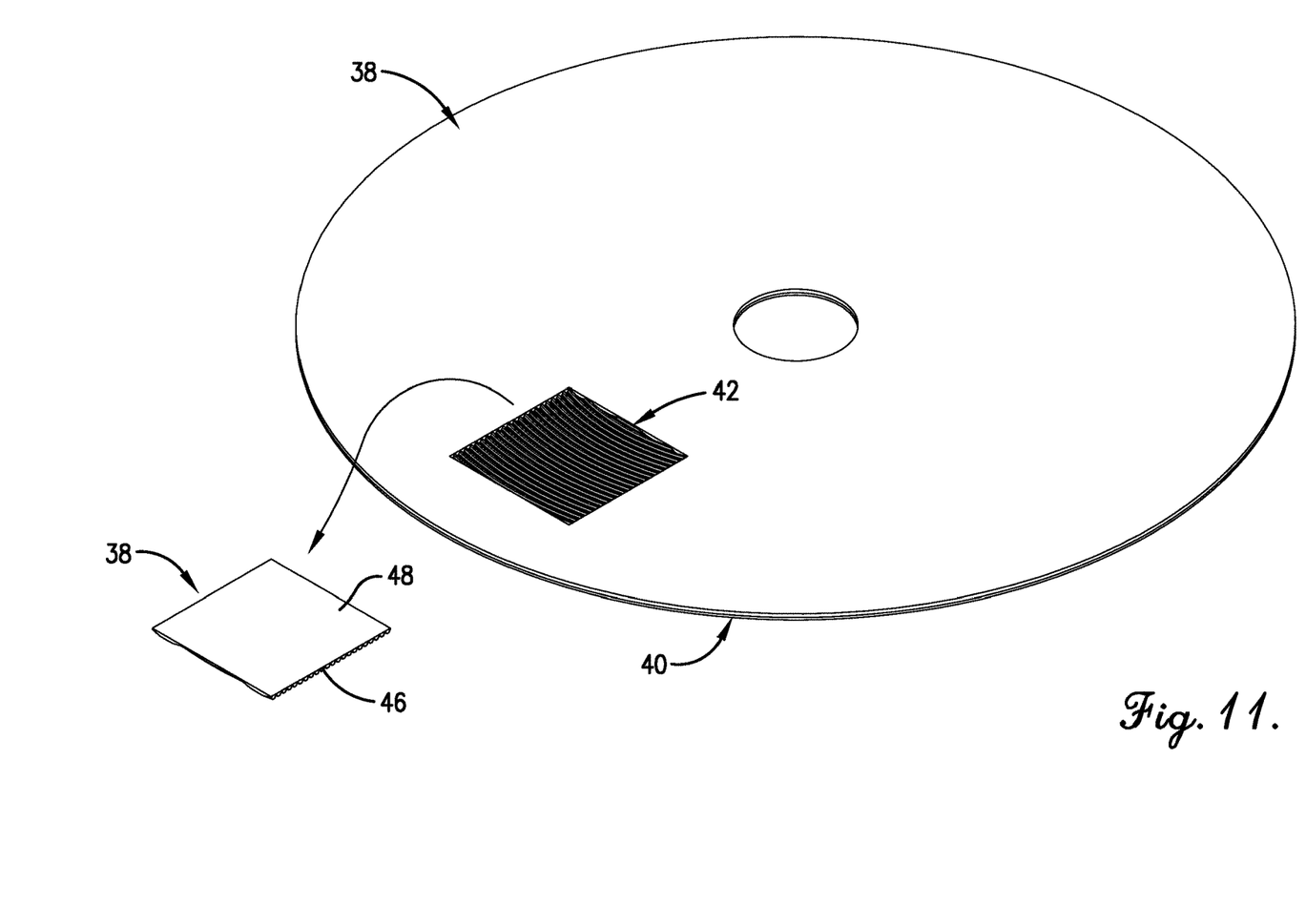
FIG. 11 is a perspective view of the mold and the stamp with a portion of the stamp removed to create a small stamp.
Figure 12:
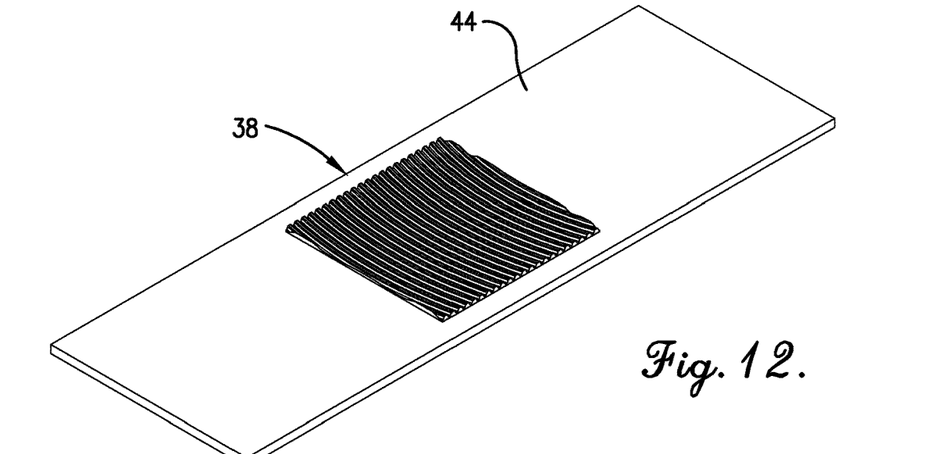
FIG. 12 is a perspective view of the stamp placed on a temporary substrate.

Referring to step 102, the stamp 38, or a portion thereof, is removed from the mold 40 and is placed on a temporary substrate 44. The temporary substrate 44 is generally a rigid body with at least one surface that is flat and smooth. An exemplary temporary substrate 44 is a glass slide, a silicon wafer, or the like. After the stamp 38 is formed, as seen in FIGS. 9-11, it may include a first surface 46 which includes the negative of the grating pattern 42 and an opposing second surface 48 which is generally flat and smooth. The stamp 38 is placed on the temporary substrate 44 such that the second surface 48 contacts the temporary substrate 44 and the first surface 46 is exposed and accessible, as seen in FIG. 12.

Figure 13:
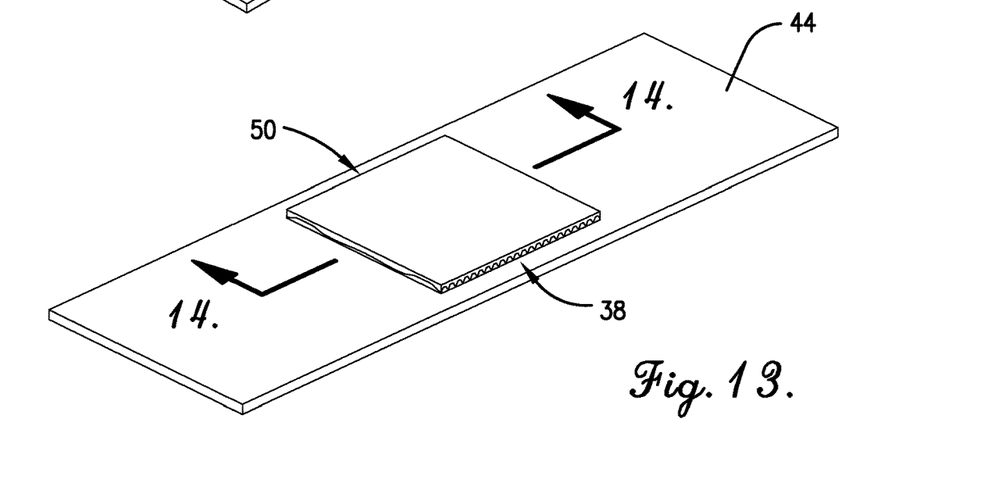
FIG. 13 is a perspective view of the stamp on the temporary substrate coated with a polymer film to create an ink.
Figure 14:
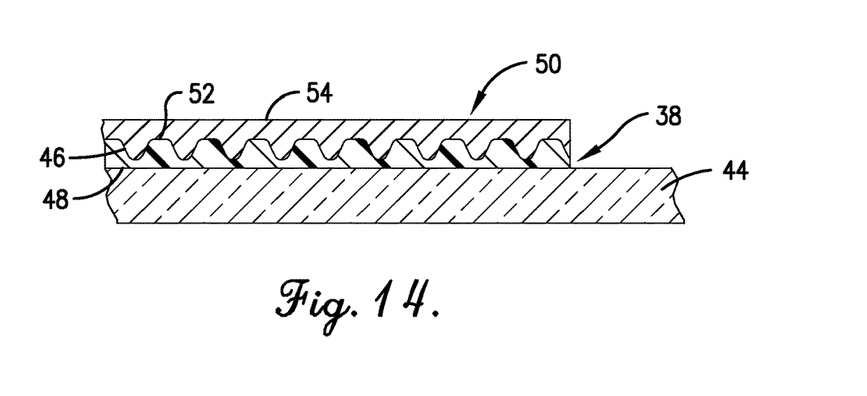
FIG. 14 is a sectional view of the stamp and the ink from FIG. 13 cut along the line 14-14.

Referring to step 103, an ink 50 is formed by applying a polymer film to the stamp 38 to receive and retain a positive of the grating pattern 42. The polymer film may include any flexible, somewhat resilient polymer that can adapt to the shape of a mold and retain that shape. An exemplary polymer film is polymethylsilsesquioxane (PMSSQ). In various embodiments, the PMSSQ may be mixed with ethanol. The polymer film that forms the ink 50 may initially be in a liquid form and may be applied to the stamp 38 by spin coating onto the exposed first surface 46, the result of which is shown in FIGS. 13 and 14. The polymer film may cure on the stamp 38 until it hardens and is solid to the touch—thereby forming the ink 50. After its formation, the ink 50 may include a first surface 52 and an opposing second surface 54, as best seen in FIG. 14. The first surface 52 includes the positive of the grating pattern 42 and is in contact with the first surface 46 of the stamp 38. The second surface 54 is generally flat and smooth.

Referring to step 104, nanogaps 30 are created in the ink 50, similar to those of the base layer 24 seen in FIG. 2. The nanogaps 30 may include tears, openings, or gaps in the polymer material of the ink 50. Exemplary nanogaps 30 may have a width ranging from approximately 20 nm to approximately 30 nm, while the length of the nanogaps 30 may vary more greatly. The nanogaps 30 may be formed by applying a tensional force to opposing ends of the stamp 38 and the ink 50 while they are in contact with one another. The nanogaps 30 may also be formed by poking holes in the combination of the stamp 38 and the ink 50, by bending the combination of the stamp 38 and the ink 50, or by reverse bending the combination of the stamp 38 and the ink 50. This step may be optional, it may be performed after the stamp 38 and ink 50 are removed from the temporary substrate 44, or it may be performed during or after step 105.

Figure 15:
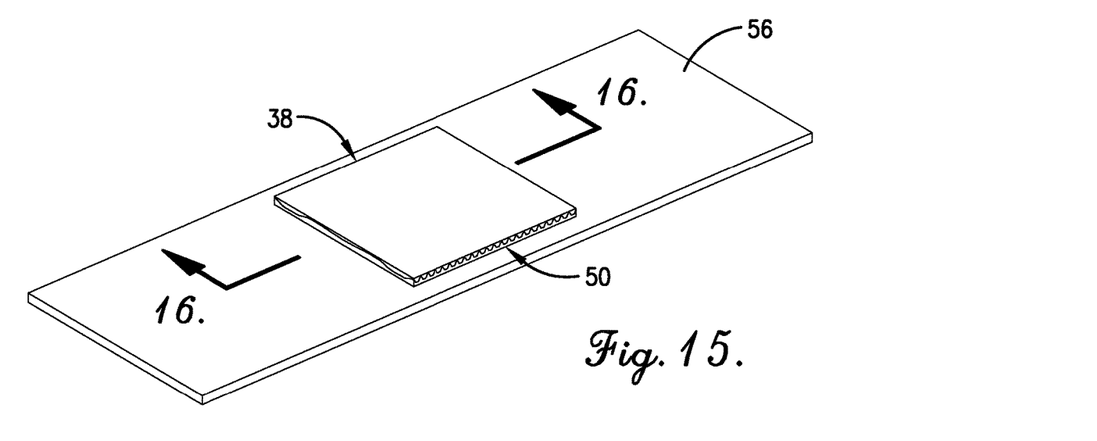
FIG. 15 is a perspective view of the stamp and the ink placed on a permanent substrate.
Figure 16:
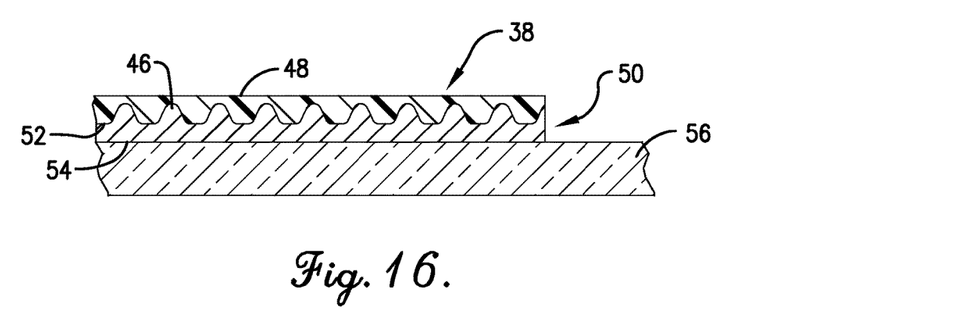
FIG. 16 is a sectional view of the stamp and the ink from FIG. 15 cut along the line 16-16.

Referring to step 105, the stamp 38 and the ink 50 are removed from the temporary substrate 44 and placed on a permanent substrate 56, as shown in FIGS. 15 and 16. The permanent substrate 56 may be similar to the temporary substrate 44. An exemplary permanent substrate 56 is a glass slide, a silicon wafer, or the like. The stamp 38 and ink 50 may be removed from the temporary substrate 44 as a unit while still contacting one another. They may be removed manually by a technician or by an automated machine. The stamp 38 and ink 50 may be placed on the permanent substrate 56 with the second surface of the ink 50 contacting a surface of the permanent substrate 56 and the second surface of the stamp 38 facing away from the permanent substrate 56. The placement may be performed manually or by automated machine. After the placement of the stamp 38 and ink 50, a period of time may elapse to allow the ink 50 to seal with the permanent substrate 56.

Figure 17:
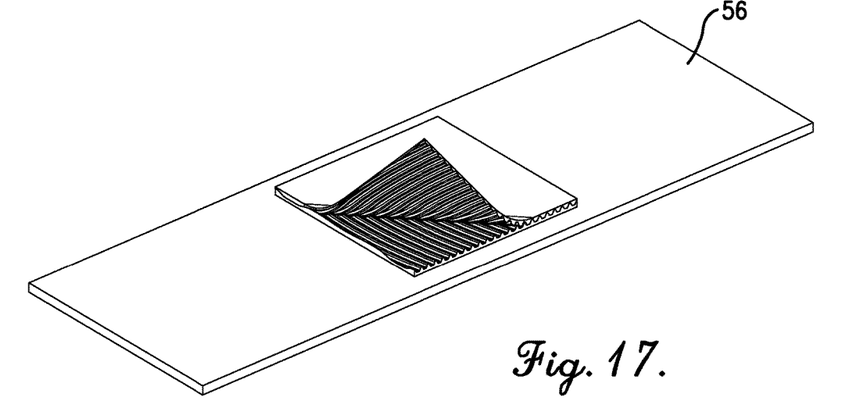
FIG. 17 is a perspective view of the stamp and the ink on the permanent substrate depicting the stamp being removed from the ink.

Referring to step 106, the stamp 38 is removed from the ink 50. In some embodiments, the stamp 38 may be peeled from the ink 50 by manually lifting one corner or edge of the stamp 38, as seen in FIG. 17, with a pair of tweezers. In other embodiments, the stamp 38 may be removed from the ink 50 by an automated machine. The process of removing the stamp 38 from the ink 50 may create nanogaps 30 in the stamp 38 which are transferred to the ink 50. Thus, after removing the stamp 38 from the ink 50, the ink 50 may a plurality of nanogaps 30 that are randomly oriented and generally positioned in proximity to the perimeter of the ink 50. Furthermore, after removing the stamp 38, the first surface 52 of the ink 50 is exposed such that the positive of the grating pattern 42 is facing upwards. In addition, the ink 50 on the permanent substrate 56 generally forms the base layer 24 on the substrate 12 of the grating structure 10.

Referring to step 107, a first functional layer 26 is applied to the ink 50. The first functional layer 26 is applied to the first surface 52 on top of the grating pattern 42. The first functional layer 26 may include plasmonic material, such as metals, or photonic material, such as dielectrics, as discussed above. The first functional layer 26 may be applied to the ink 50 using known deposition techniques. The first functional layer 26 may also be applied to the ink 50 by chemical procedures such as the sol-gel process in which the material of the first functional layer 26 is applied to the ink 50 in a solution. In some embodiments, the material of the first functional layer 26 may deposited at an angle that is normal to the plane of the ink 50. The result of the deposition may be similar to the grating structure 10 as shown in FIGS. 1 and 3. The first functional layer 26 may also be applied such that it does not fill in or completely cover the nanogaps 30 which are formed in the ink 50.

In other embodiments, the material of the first functional layer 26 may deposited at an angle that is not normal to the plane of the ink 50, similar to the deposition illustrated in FIG. 3. This angled deposition is typically accomplished by tilting the permanent substrate 56 and the ink 50 thereupon with respect to the source from which the first functional layer 26 material is deposited. The deposition angle, i.e., the angle of tilt, may range from approximately zero degrees to approximately 85 degrees from planar normal. Furthermore, the axis of tilt for the permanent substrate 56 is generally parallel to the longitudinal axis of the grating elements 16 of the grating pattern 42 of the ink 50. The tilting of the permanent substrate 56 and the ink 50 during deposition of the first functional layer 26 may result in each grating element 16 having the features of the nanogap 32, the tip 34, the plateau 36, and the nanospurs 58, as described above and shown in FIGS. 3 and 4.

The permanent substrate 56 and the ink 50 may have an inherent surface energy or their surface energies may be controlled and adjusted. The material of the first functional layer 26 may have an inherent energy level or may be given an energy level as well. In addition, the material of the first functional layer 26 may be ionic in nature. Energies of the material of the first functional layer 26, the permanent substrate 56, and the ink 50 may be controlled or adjusted thermally, through temperature control, electrically, through voltage control, or by other methods. The energy levels of one or more of the three components may determine the optimal angle for applying the material of the first functional layer 26 in order to form the features of the nanogap 32, the tip 34, the plateau 36, and the nanospurs 58. The physical characteristics of the grating pattern 42 of the ink 50, such as the spacing between grating elements 16, the height of the peak 20, and/or the aspect ratio of the height to the spacing may also influence the value of the optimal angle for applying the material of the first functional layer 26. Furthermore, the thickness of the functional layer 26 may influence the value of the optimal angle for applying the material of the first functional layer 26. As an example, for an ink 50 made from PMSSQ with a grating pattern 42 that is formed from an HD-DVD mold 40 (and has the corresponding spacings and heights) and a first functional layer 26 of silver applied with a thickness of 40 nm, the optimal angle of deposition is approximately 75 degrees.

In certain embodiments, the first functional layer 26 may include one or more sublayers of material. For example, when forming a plasmonic first functional layer 26, there may be a sublayer of metal, which enhances adhesion between the ink 50 and the first functional layer 26. The sublayers may be deposited onto the ink 50 in the same fashion as the first functional layer 26.

Referring to step 108, a second functional layer 60 is applied to the first functional layer 26, as shown in FIGS. 5 and 6. This step may be optional. However, when it is performed, the first functional layer 26 typically includes photonic material such as titanium oxide, and the second functional layer 60 includes plasmonic material such as silver. Furthermore, the first functional layer 26 is deposited at angle of approximately zero degrees from planar normal. The second functional layer 60 is typically deposited at an angle ranging from greater than zero degrees to approximately 85 degrees from planar normal.

Figure 18:
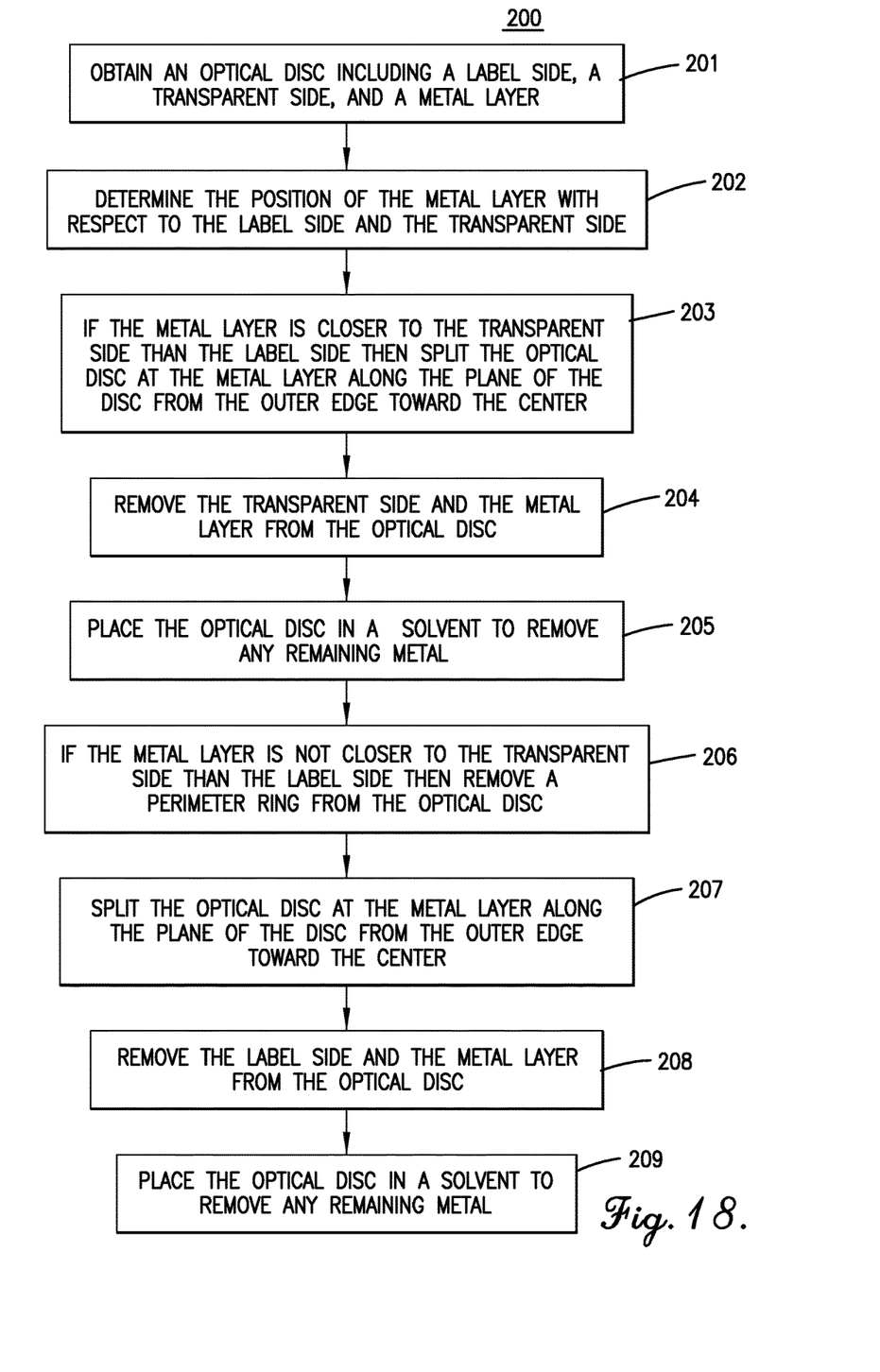
FIG. 18 is a flow diagram of at least a portion of the steps of a method of producing a mold that includes a grating structure.

At least a portion of the steps of a method 200, in accordance with various aspects of the invention, for producing a mold 40 with a grating pattern 42 is shown in FIG. 18. The steps of the method 200 may be performed in the order as shown in FIG. 18, or they may be performed in a different order. Furthermore, some steps may be performed concurrently as opposed to sequentially. In addition, some steps may not be performed.

Figure 19:
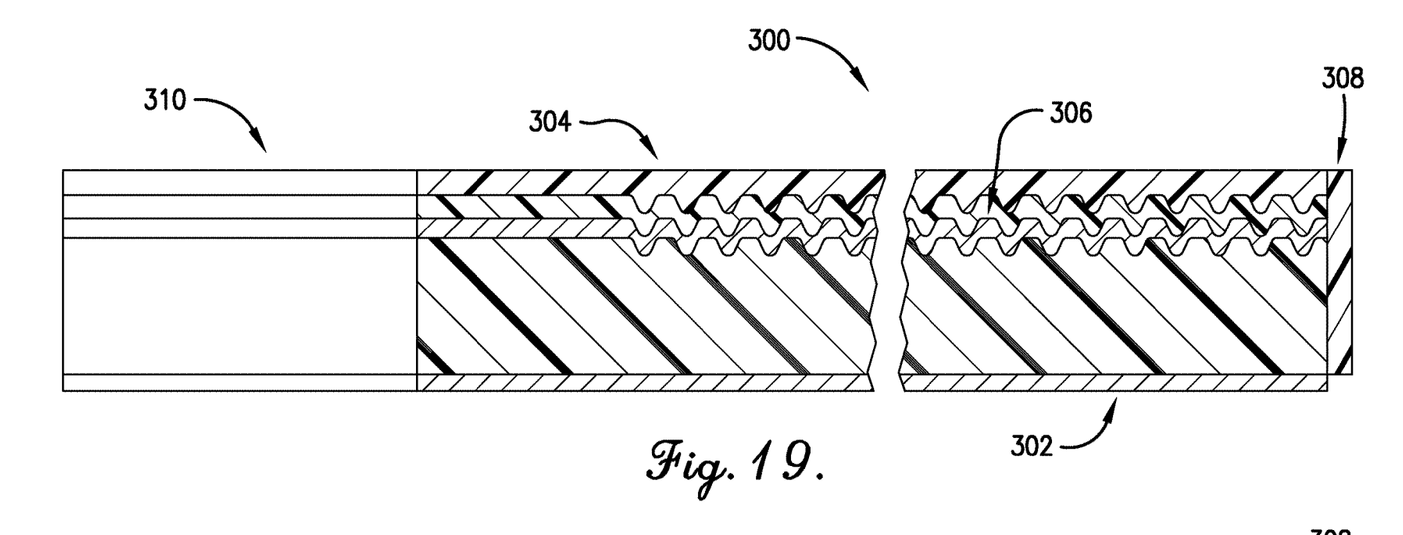
FIG. 19 is a sectional view of a first type of optical disc with a metal layer and a transparent side in which the metal layer is closer to the transparent side.
Figure 21:
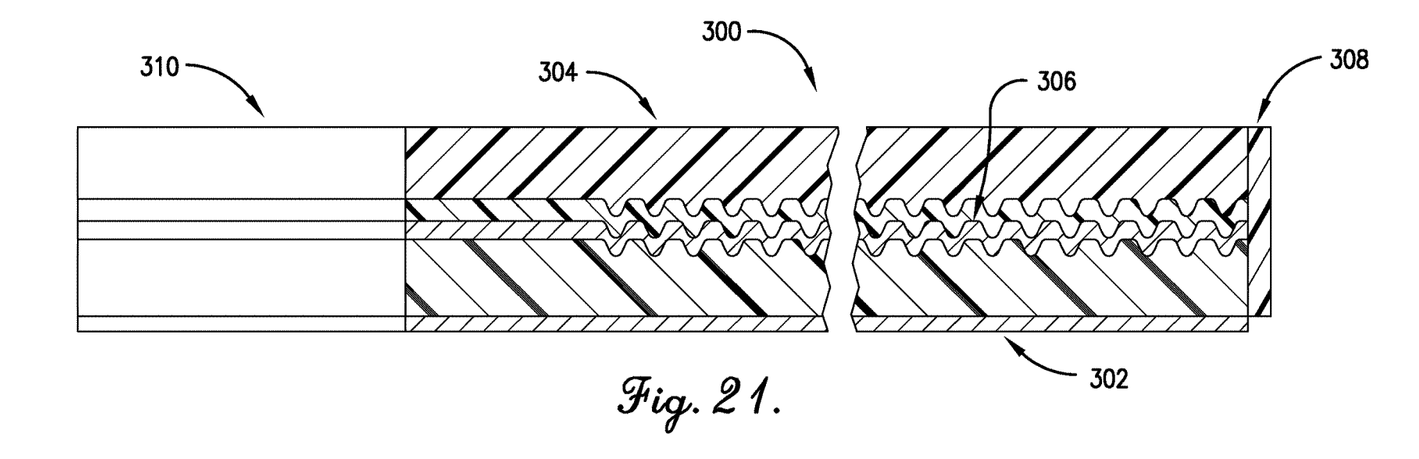
FIG. 21 is a sectional view of a second type of optical disc with a metal layer, a transparent side, and a label side in which the metal layer is not closer to the transparent side.

Referring to step 201, an optical disc 300 is obtained, including a label side 302, a transparent side 304, and a metal layer 306, as seen in FIGS. 19 and 21. The optical disc 300 may include a perimeter ring 308 and a center ring 310 as well. The optical disc 300 may be of known optical data storage disc types with data tracks arranged in concentric circles. Exemplary optical discs 300 include 12-centimeter diameter discs, such as compact disc (CD), digital video disc (DVD), high definition DVD (HD-DVD), Blu-ray™ disc, and the like. Typically, the optical disc 300 is blank (with no pre-recorded data on it), single sided, and with a single data layer. The label side 302 may be what is considered the top surface of the disc, often with a manufacturer's name or logo on it. The label side 302 may also have an opaque coating. The transparent side 304 may be considered the bottom surface of the disc, on the opposite side from the label. The label side 302 and the transparent side 304 may both include a rigid polymer material, such as polycarbonate, that gives the optical disc 300 its structure. During usage of the optical disc 300, a laser shines light through the transparent side 304 in order to read data from the optical disc 300. Thus, the transparent side 304 is transmissive to light of varying wavelengths. The metal layer 306 generally provides reflection of the laser light which determines the data stored on the optical disc 300. The perimeter ring 308 is a space at the edge of the optical disc 300 in which there are no data tracks.

At the metal layer 306, there may be two grating patterns forming the data tracks, one on the label side 302 and one on the transparent side 304, wherein one grating pattern is a mirror image or negative of the other and the metal layer is positioned between the two patterns. Furthermore, the grating patterns may be similar to the grating pattern 42 and the array 14 of grating elements 16.

Referring to step 202, a position of the metal layer 306 is determined with respect to the label side 302 and the transparent side 304. The thickness of the optical disc 300 is generally constant for the different types of discs, however the position of the metal layer 306 varies with the type. The metal layer 306 in a CD is close to the label side 302. The metal layer 306 in a DVD and an HD-DVD is positioned near the center of the optical disc 300. In a Blu-ray™ disc, the metal layer 306 is close to the transparent side 304.

Referring to step 203, the optical disc 300 is split at the metal layer 306 along the plane of the disc from the outer edge at the perimeter ring 308 toward the center ring 310, if the metal layer 306 is closer to the transparent side 304 than the label side 302, as seen in FIG. 19. The optical disc 300 is likely a Blu-ray™ disc. An exemplary method to splitting the optical disc 300 includes cutting the optical disc 300 with a sharp object, such as a razor blade, at the edge of the disc parallel to its plane. The optical disc 300 usually separates into two pieces along the metal layer 306—the two pieces being the label side 302 and the transparent side 304.

Figure 20:
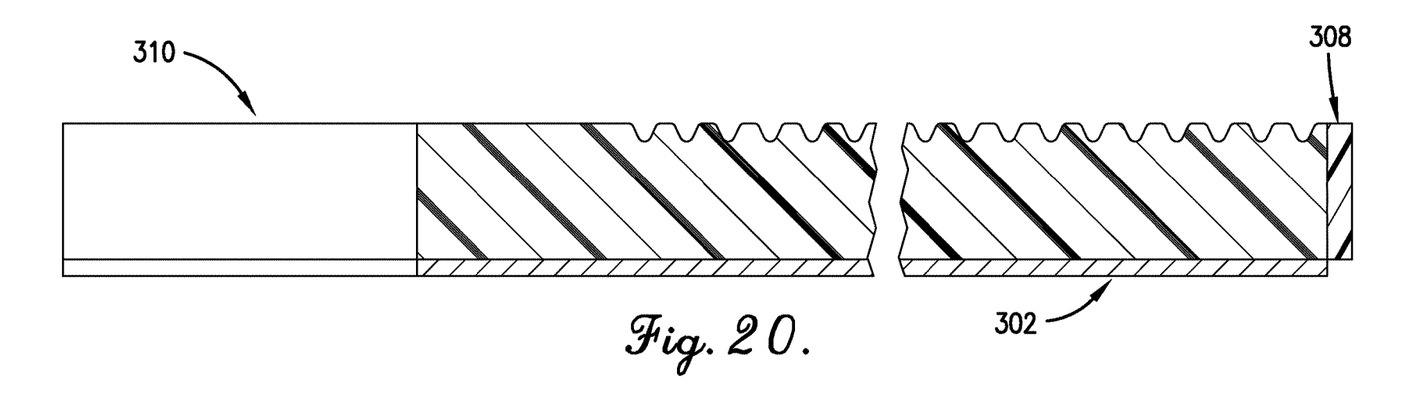
FIG. 20 is a sectional view of the first type of optical disc in which the metal layer and the transparent side have been removed.

Referring to step 204, the transparent side 304 and the metal layer 306 are removed from the optical disc 300. Thus, the label side 302 with a grating pattern remain, as seen in FIG. 20. In some cases, fragments of the metal layer 306 may remain as well.

Referring to step 205, the optical disc 300 is placed in a solvent to remove any remaining metal. An exemplary solvent includes 15% nitric acid. Other solvents, cleaners, and debris removal techniques may be utilized as well.

Referring to step 206, the perimeter ring 308 is removed from the optical disc 300, if the metal layer 306 is not closer to the transparent side 304 than the label side 302, as seen in FIG. 21. The optical disc 300 may be a DVD or an HD-DVD. The perimeter ring 308 may be removed by cutting it off of the optical disc 300 using a sharp object or by grinding it off. Removal of the perimeter ring 308 may make it easier to access the metal layer 306 for performing the next step.

Referring to step 207, the optical disc 300 is split at the metal layer 306 along the plane of the disc from the outer edge toward the center ring 310. As discussed in step 203, the optical disc 300 separates into two pieces, the label side 302 and the transparent side 304, along the metal layer 306.

Figure 22:
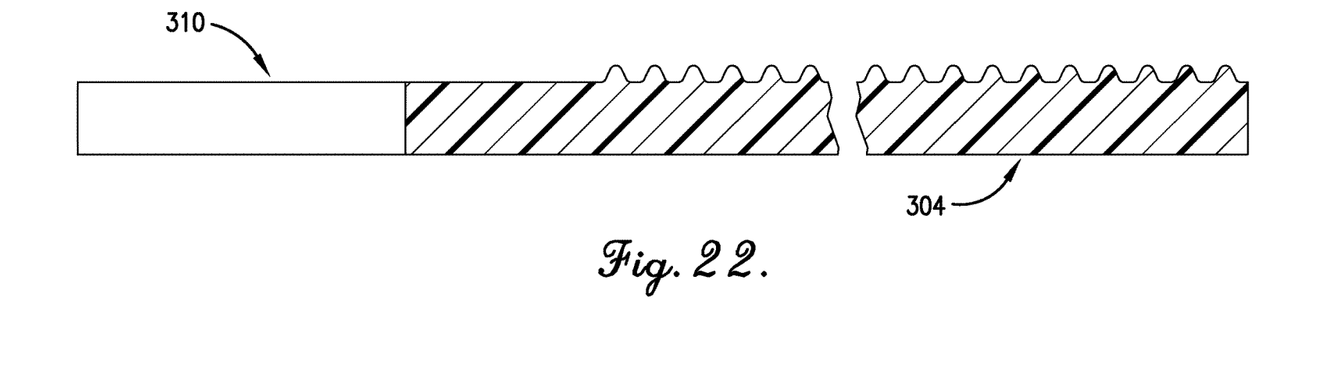
FIG. 22 is a sectional view of the second type of optical disc in which the metal layer and the label side have been removed.

Referring to step 208, the label side 302 and the metal layer 306 are removed from the optical disc 300. Thus, the transparent side 304 with a grating pattern remain, as seen in FIG. 22. In some cases, fragments of the metal layer 306 may remain as well.

Referring to step 209, the optical disc 300 is placed in a solvent to remove any remaining metal. As with step 205, the solvent may include 15% nitric acid. Other solvents, cleaners, and debris removal techniques may be utilized as well.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A grating structure comprising:
a substrate including a smooth upper surface;
a base layer positioned on the substrate, the base layer including
a first surface with a plurality of grating elements positioned adjacent one another, each grating element including a longitudinal peak and a longitudinal valley, and
a second surface, opposing the first surface, in contact with the upper surface of the substrate; and
a contiguous first functional layer conformally covering the second surface of the base layer applied at a deposition angle away from normal on the second surface of the base layer, such that the first functional layer has a non-uniform thickness and such that the deposition angle of the first functional layer produces an enhanced fluorescence of a sample,
wherein the first functional layer includes a nanogap in the longitudinal valley,
wherein the nanogap measures between 10 nanometers and 30 nanometers in lateral width; and
wherein the nanogap produces the fluorescence enhancement in the vicinity of the nanogap.

2. The grating structure of claim 1, wherein the first functional layer includes a longitudinal peak aligned with the peak of the base layer and a longitudinal valley aligned with the valley of the base layer.

3. The grating structure of claim 1, wherein the first functional layer includes a plateau and a tip, wherein the tip is a longitudinal peak, and the plateau is a rounded surface extending therebetween.

4. The grating structure of claim 3, wherein the tip includes a plurality of nanospurs abutting one another along the length thereof, wherein each nanospur includes or forms a peak.

5. The grating structure of claim 1, further comprising a second functional layer applied to an upper surface of the first functional layer, such that the first functional layer is formed from a dielectric and the second functional layer is formed from a metal or a metal alloy.

6. The grating structure of claim 1, wherein the first functional layer is formed from a metal or a metal alloy.

7. The grating structure of claim 1, wherein the first functional layer is formed from a dielectric.

8. The grating structure of claim 1, wherein the deposition angle is between approximately 65 degrees away from normal to approximately 80 degrees away form normal.

9. The grating structure of claim 1, wherein first functional layer is further applied in a direction transverse to an axis of the longitudinal peak and the longitudinal valley.

10. A grating structure comprising:
a substrate including a smooth upper surface;
a base layer positioned on the substrate, the base layer including
a first surface with a plurality of grating elements positioned adjacent one another, each grating element including a longitudinal peak and a longitudinal valley, and
a second surface, opposing the first surface, in contact with the upper surface of the substrate; and
a contiguous first functional layer conformally covering the second surface of the base layer, such that the deposition angle of the first functional layer produces a nanogap in the longitudinal valley of the first functional layer;
wherein the nanogap measures between 10 nanometers and 30 nanometers in lateral width; and
wherein the nanogap causes fluorescence enhancement of a sample in the vicinity of the nanogap.

11. The grating structure of claim 10, wherein the fluorescence is enhanced by a factor between 68 and 300 over a glass slide baseline.

12. The grating structure of claim 11, wherein the fluorescence is enhanced by a factor between 118 and 300 over a glass slide baseline.

13. The grating structure of claim 10, wherein the fluorescence is enhanced by a factor between 25 and 300 over a glass slide baseline.

14. The grating structure of claim 10, wherein the longitudinal peak has a height of approximately 60 nanometers.

15. The grating structure of claim 10, wherein the nanogap is approximately 20 nanometers in lateral width.

16. The grating structure of claim 1, wherein the fluorescence is enhanced by a factor between 68 and 300 over a glass slide baseline.

17. The grating structure of claim 16, wherein the fluorescence is enhanced by a factor between 118 and 300 over a glass slide baseline.

18. The grating structure of claim 1, wherein the fluorescence is enhanced by a factor between 25 and 300 over a glass slide baseline.

19. The grating structure of claim 1, wherein the nanogap is approximately 20 nanometers in lateral width.

20. The grating structure of claim 3, wherein the plateau is approximately 90 nanometers and the tip is between 10 nanometers and 30 nanometers.

* * * * *